(12) United States Patent
Danesi et al.

(10) Patent No.: US 12,496,617 B2
(45) Date of Patent: Dec. 16, 2025

(54) X-RAY SEPARATOR FOR SORTING METALS FROM RECYCLED MATERIAL

(71) Applicant: SGM MAGNETICS S.P.A., Manerbio (IT)

(72) Inventors: Stefano Danesi, Montichiari (IT); Francesco Olian Fannio, Brescia (IT); Gabriele Turini, Martignana di Po (IT)

(73) Assignee: SGM MAGNETICS S.P.A., Manerbio (IT)

( * ) Notice: Subject to any disclaimer, the term of this patent is extended or adjusted under 35 U.S.C. 154(b) by 0 days.

(21) Appl. No.: 18/846,015

(22) PCT Filed: Mar. 10, 2023

(86) PCT No.: PCT/IB2023/052302
§ 371 (c)(1),
(2) Date: Sep. 11, 2024

(87) PCT Pub. No.: WO2023/175459
PCT Pub. Date: Sep. 21, 2023

(65) Prior Publication Data
US 2025/0196191 A1    Jun. 19, 2025

(30) Foreign Application Priority Data
Mar. 15, 2022   (IT) .................. 102022000005012

(51) Int. Cl.
*B07C 5/34*    (2006.01)
*G01N 23/083*  (2018.01)
*G01N 23/223*  (2006.01)

(52) U.S. Cl.
CPC ......... *B07C 5/3416* (2013.01); *G01N 23/083* (2013.01); *G01N 23/223* (2013.01); *B07C 2501/0054* (2013.01); *G01N 2223/643* (2013.01)

(58) Field of Classification Search
CPC .......... B07C 5/3416; B07C 2501/0054; G01N 23/083; G01N 23/223; G01N 223/643
See application file for complete search history.

(56) References Cited

U.S. PATENT DOCUMENTS 9,956,609 B1 * 5/2018 De Saro ................ B22D 47/00
2007/0030953 A1   2/2007 Sommer, Jr. et al.

FOREIGN PATENT DOCUMENTS

WO   WO-2012094568 A2 *  7/2012 ........... B07C 5/3416

OTHER PUBLICATIONS

International Search Report and Written Opinion for Corresponding International Application No. PCT/IB2023/052302, May 12, 2023, 7 pages.

* cited by examiner

*Primary Examiner* — Michael Mccullough
*Assistant Examiner* — Kalyanavenkateshware Kumar
(74) *Attorney, Agent, or Firm* — LUCAS & MERCANTI, LLP

(57) ABSTRACT

An X-ray separator for sorting metals from recycled material includes an X-ray source that produces a radiation beam capable of passing through the material carried by a conveyor belt and reaching an array of transmission sensors and also generating a fluorescence signal that is detected by an array of fluorescence sensors placed adjacent to the beam, so that the separator simultaneously performs both fluorescence and transmission analysis using both phenomena caused by the single beam.

13 Claims, 3 Drawing Sheets

X-RAY SEPARATOR FOR SORTING METALS FROM RECYCLED MATERIAL

CROSS-REFERENCE TO RELATED APPLICATIONS

This application is a 371 of PCT/IB2023/052302, filed Mar. 10, 2023, which claims the benefit of Italian Patent Application No. 102022000005012, filed Mar. 15, 2022.

FIELD OF THE INVENTION

The present invention concerns the recovery of metals from scrap, and in particular an X-ray separator for sorting nonferrous metals.

BACKGROUND OF THE INVENTION

As is well known, at the end of their lives, cars, and also other large industrial and household products of essentially metallic composition, are ground with large hammer mills (so-called car shredders) that reduce them into pieces less than 150 mm in size so as to obtain scrap metal. On leaving these mills, the mixed ground material undergoes a deferrization action using large electromagnetic drums for the purpose of recovering and cleaning up the ferromagnetic steel.

What is discarded by such electromagnetic drums consists mainly of plastics, rubbers, polyurethane foams, glass, aluminum, copper, zinc, zamac, lead, stainless steel, electrical wires, stone residues, iron oxides, and some ferromagnetic steel parts lost during the deferrization action. Next, Foucault current and inductive sensors separators are employed to produce mixed metal concentrates.

Further wet or dry densimetric separation processes allow the separation of light non-ferrous metals, such as aluminum and magnesium, from heavy metals such as copper, brass, stainless steel, and lead. The present invention finds application in the subsequent step focusing on the separation of metals of different natures.

A special feature of this application is that the separation process, to achieve the throughput of at least 1 ton/h typically considered as a minimum for the recycling industry, requires working on high numbers of pieces/hour since the weight of the pieces varies from a few grams (3-4 g) to over 1000 g with an average weight typically ranging from 10 to 50 g. This implies that the separator has a time in the order of milliseconds, typically 5 to 50 ms, to identify the chemical composition of each piece that makes up the material stream.

Separators that are capable of performing this task use an X-ray technique that can be of two types, fluorescence technique (X-Ray Fluorescence=XRF) or transmission technique (X-Ray Transmission=XRT).

The XRF fluorescence technique makes it possible to gather information about the chemical nature of a material through a purely superficial investigation, since the signal comes from a few hundred micrometers deep from the surface, so it says nothing about the internal composition of the piece (called the "sample") being analyzed and is reliable only under the assumption of absolute homogeneity of sample composition. In other words, if the interior of the sample, called the "bulk," has a different chemical composition from the surface layer, for example because the sample is made from a piece of a certain metal with an insert composed of another metal, fluorescence will not be able to establish this.

This is a frequent situation when considering the material obtained from a car shredder as the material from which to sort metals, since the metal pieces to be sorted may be composed of a mixture of metals or inserts of metals with different chemical nature, or metals with a coating of other metals (e.g., galvanized pieces). Another frequent case is tubes and wires covered with a plastic sheath, which can prevent the fluorescence signal of the underlying metal from being detected if it is sufficiently thick, so that XRF analysis leads to the conclusion that there is no metal in the sample. In addition, the material can be dirty, and the surface layer of dirt, usually metal powders, can also alter the result of the XRF analysis.

Additional drawbacks of the XRF technique are limitations on the metals to be sorted and poor spatial resolution. In the former case, due to the speed of analysis that the application under consideration imposes (a few milliseconds per piece), the fluorescence phenomenon is very weak for lighter elements such as Al or Mg, while it is definitely more intense for heavier chemical elements (e.g., from Ti on up).

In terms of spatial resolution, a typical XRF separator comprises a source producing a polychromatic X-ray beam that is projected onto the material stream to be analyzed, with an adjacent array of fluorescence sensors (called SDDs=Silicon Drift Detectors) arranged equidistant from each other along a linear array transverse to the direction of the stream. Ideally, the longitudinal resolution in the flow direction is limited by the sample speed and acquisition time of the SDDs, which typically ranges from 5 ms to 50 ms, while the transverse resolution is limited by the number of SDDs and the pitch with which they are arranged along the array (typically 15 mm to 60 mm). For example, with SDDs having a pitch of 50 mm, which corresponds to the width of the field of view of each SDD, an acquisition time of 15 ms, and a material passage time of 2.5 mm/ms, we obtain a readout "surface" of 1875 square mm (=50 mm×15 ms×2.5 mm/ms), which is comparable with the average surface area of the parts being processed.

In view of the low spatial resolution of the XRF technique, it is always necessary to combine it with a second technique that allows both the shape of the sample and its location to be identified with greater resolution. This information is essential for both the analysis of the sample and the implementation of the separation between the different metals identified. The techniques used for such a combination are either a camera (black-white or color) or a 3-D laser scanner, or possibly both.

The typical design of an XRF separator involves feeding the material by means of a horizontal conveyor belt with the X-ray source and sensors placed above it to avoid obstacles to the propagation of the fluorescence signal. Typical values of source-belt distance are in the range of 100-300 mm, preferably 100-200 mm, and the anode-cathode voltage in the source must be modified according to this distance in order to optimize the fluorescence emission signal. The voltages used are in the range 20-75 kV, preferably 30-40 kV, with source power less than 500 W.

Under these conditions, known XRF separators allow identification below 6% Cu and 11% Zn in an Al alloy, which are the maximum percentages of Cu and Zn in an Al alloy, respectively. The fluorescence signal is analyzed by a linear array of SDDs whose distance from the belt can vary from 1 cm to several centimeters, depending on the height of the pieces passing over the belt that should not bump into the sensors. The state-of-the-art trend is to move the source closer to the belt, using smaller and smaller powers and lower and lower voltages to maximize the fluorescence signal.

An alternative possible configuration is to perform the analysis "on the fly," i.e., with the parts falling from the conveyor belt or a chute and the analyzing elements (source, SDDs) placed close to the position of the start of the fall, typically below the fall trajectory of the pieces. In this way, the height of the pieces and their arrangement does not affect their distance from the analyzing elements, as is the case when the analysis is performed on the conveyor belt, because the distance from the base of the analyzed sample is constant.

The XRT transmission technique overcomes several limitations of the XRF technique and differs in the type of sensors, which are based on the scintillator technique, and in their arrangement on the opposite side of the sample from the X-ray source, which has greater power than in the XRF technique and is placed farther away. The source-sensor distance is typically between 500 mm and 1200 mm, and is chosen as a compromise between the need to maximize process throughput and the need to optimize the transmission signal. The first requirement is met by increasing the source-sensor distance, as the portion of the belt illuminated by the beam is increased, while the second requirement is met by bringing the source as close as possible to the sensors, since there is increased the low-energy component in the beam where absorption differences are most pronounced.

Independently of the above distance, the anode-cathode voltage that optimizes the transmission signal for possible configurations is between 130 kV and 160 kV with currents up to 19 mA (corresponding to a maximum power of about 3 kW). The sources can be equipped with beryllium or copper windows that act as radiation filters, depending on whether the application requires a spectrum more or less unbalanced toward high energies.

The radiation emitted by the X-ray source passes through the entire sample and is transmitted on the opposite side to the sensors, which consist of photodiodes coated with a scintillator material, which transforms the X-ray radiation into visible radiation and then into a current signal. The current signal is transformed into voltage, amplified and then sampled and quantized through analog-to-digital conversion electronics.

The photodiodes are chosen in such a way as to obtain a far higher resolution than that provided by the fluorescence sensors used in the XRF technique, the size of the sensors being approximately 0.4-3.2 mm, while the acquisition times range from 10 µs to tens of milliseconds. Also in the XRT technique, the sensors are arranged side by side to form a linear array transverse to the material feed direction. Successive scans that are contiguous in time allow the image of the sample passage to be reconstructed.

An alternative configuration allows for a spectroscopy termed "dual energy" (DE), i.e., with two arrays of sensors identical in size and pitch but with different energy sensitivities, as described, for example, in US 2007/030953. The two arrays are overlapped so that the upstream array, with respect to the direction of origin of the beam, generates a signal that integrates absorption at the low energies (typical range 30 keV to 90 keV) emitted by the X-ray source, while the downstream array integrates absorption at the high energies (typical range 70 keV to 150 keV). Values in the 70-90 keV overlap range, where both arrays give a signal, are usually filtered out and eliminated during readout data processing.

If the source spectrum is polychromatic, then the transmitted radiation carries with it the imprint of the absorption coefficient, which differs for each chemical element and its alloys. The result is two images of the sample, with spatial resolution equal to the side of the photodiode, and taking into account the different effect of the absorption coefficient at high and low energies.

The advantages of the XRT technique are to be able to have spatially very detailed information, and to be able to assess the nature of the material within the piece. The good transverse and longitudinal resolution allows the implementation of the recognition of shape or characteristic morphological details, without requiring the combination with a camera or laser scanner as in the XRF technique. Samples with local inhomogeneities, such as inserts, are easily detected, and the presence of surface dirt does not impair the analysis.

The disadvantages of the XRT technique reside in the limited chemical resolution, in the possibility of having total absorption of radiation by the sample, and in the inability to distinguish between a surface coating material and an alloy material. In the first case, the drawback arises from the fact that elements having similar atomic numbers are hardly recognized differentially, and from theoretical calculation it is shown that it is possible to detect exactly a number of chemical elements equal to the number of arrays at the different energies, i.e., only two in DE spectroscopy, although in theory even more than two overlapping arrays could be used. In addition, the minimum percentage change in chemical ligand capable of generating a change in the transmission signal is different from element to element.

In the second case, if the analyte is composed of heavy alloys (e.g., steel alloys, copper alloys, brass, zinc alloys) and is sufficiently thick, the signal transmitted toward the sensors is very weak or even nil. Finally, a sample in which metal X is used for a surface coating of a piece made of metal Y is indistinguishable from a sample composed of an alloy of metals X+Y, since the transmission signal is still a linear combination of the absorption by the two metals.

SUMMARY OF THE INVENTION

It is therefore the purpose of the present invention to provide an X-ray separator that overcomes the above drawbacks. This purpose is achieved by means of a separator having a single X-ray source whose location and operating parameters allow both an XRF and an XRT analysis to be performed simultaneously, due to the presence of both fluorescence and transmission sensors. Further advantages and features of this separator are given in the secondary claims.

Thus, the fundamental advantage of the present device is to exploit two complementary physical phenomena, with the use of a single common excitation source, so that the use of the two techniques XRF and XRT in synergy allows the scope of application to be extended beyond the combined scope of the two techniques taken separately. In other words, as will be illustrated below, this makes up for the inherent limitations of the techniques used when taken individually, and exploiting their complementarity provides a greater degree of certainty in the analysis and a broader scope of application, which cannot be replicated by applying a separate XRF and XRT analysis in succession. Moreover, such a combination overcomes the technical prejudice about the difficulty of combining the two readings, as in WO 2012/

094568, which uses the XRT technique but involves the presence of a film or coating to eliminate or reduce fluorescence radiation.

Another important advantage of the above apparatus is its structural simplicity and low cost, since it does not require analyzer components (source, sensors) that are technically different from those used in conventional apparatuses, and it costs less than two separate XRF and XRT separators, while providing better performance than either of them or a system in which said separators are arranged in series.

BRIEF DESCRIPTION OF THE DRAWINGS

Further advantages and features of the X-ray separator according to the present invention will be apparent to those skilled in the art from the following detailed description of an embodiment thereof with reference to the attached drawings, in which.

DETAILED DESCRIPTION OF THE INVENTION

Figure 1:
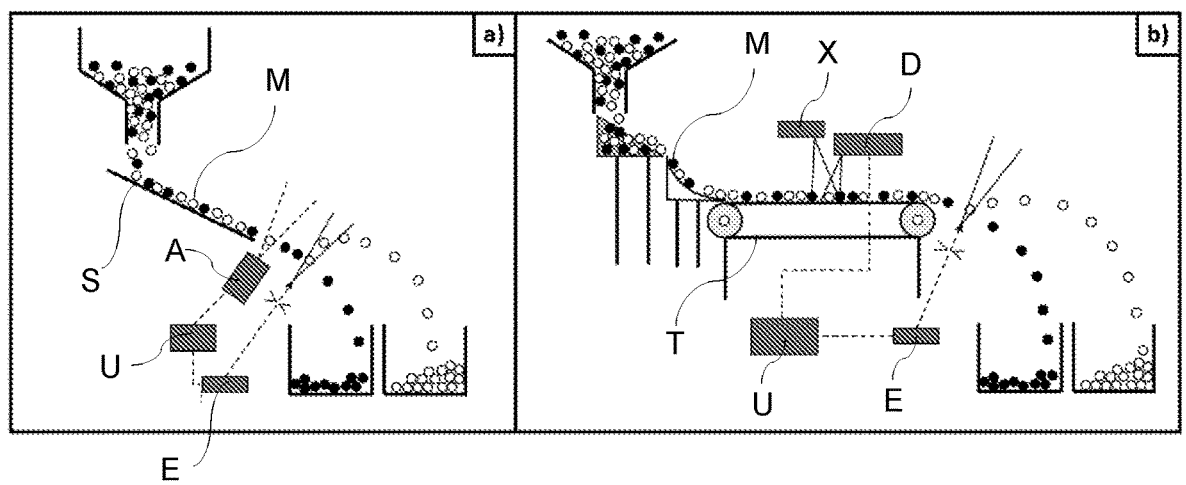
FIG. 1 is a longitudinal sectional view showing schematically the structure of a conventional XRF separator in two possible configurations.

Referring to FIG. 1, it can be seen that a prior art XRF separator can be made in a first configuration (a) for "on-the-fly" analysis in which the material M flows down a chute S and as soon as it starts its fall from the chute S it is analyzed by an analysis system A placed below the fall trajectory. Such an analysis system A includes a suitable X-ray source and an array of SDDs for analyzing the ground material M by the XRF technique, and its readings are analyzed in a control unit U that commands the control electronics E of a valve that emits a jet of air to deflect the trajectory of the metal to be recovered. In this way, the metal (white circle) is directed toward a more distant collection container, while the waste material (black circle) proceeds on its path to falling into a closer collection container.

In the second configuration (b), the material M is fed by a horizontal conveyor belt T, passing under a source X that emits a beam of radiation capable of causing the fluorescence phenomenon that is detected by an adjacent array of sensors D. As in the previous configuration, the readings from the sensors D are analyzed in a control unit U that commands the control electronics E of a valve that emits a jet of air to deflect the trajectory of the metal to be recovered when it falls from the conveyor belt T.

Figure 2:
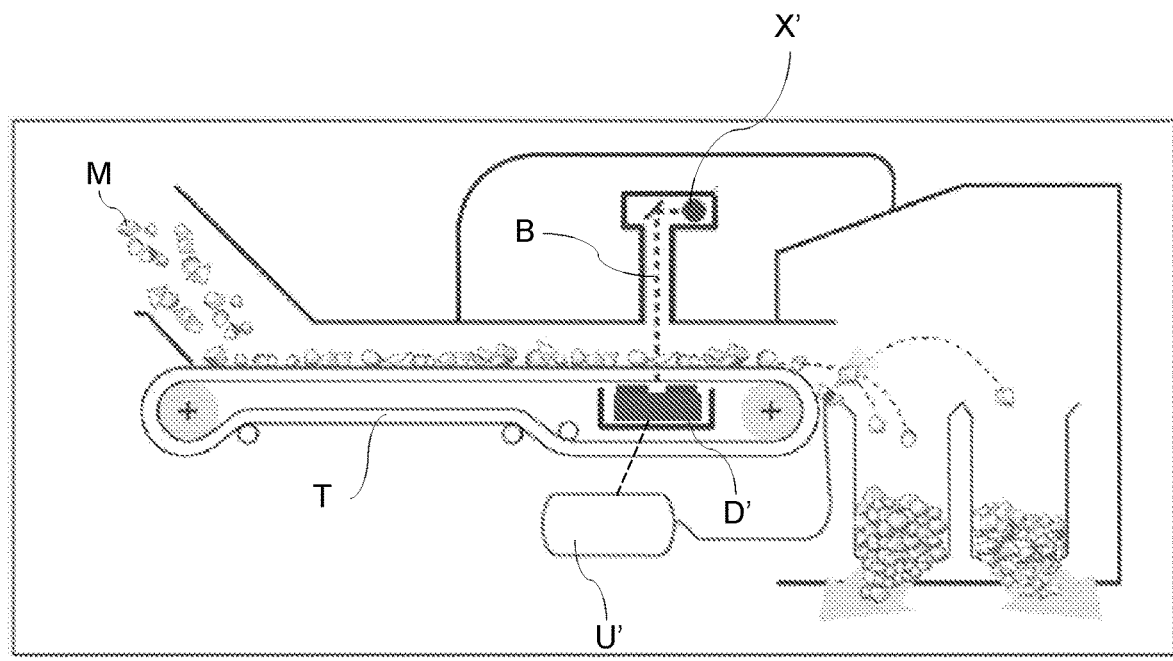
FIG. 2 is a longitudinal sectional view showing schematically the structure of a conventional XRT separator.

The configuration of a conventional XRT separator is shown in FIG. 2, and corresponds in many respects to the configuration in FIG. 1 (b), with the material M being fed by a horizontal conveyor belt T, passing under a source X' of suitable power that emits a beam of radiation B capable of passing through the material M and the conveyor belt T to be detected by an array of sensors D', placed between the upper and lower branches of the conveyor belt T. As in the previous configurations, the readings from the D' sensors are analyzed in a control unit U' that also includes control electronics for a valve that emits a jet of air to deflect the trajectory of the metal to be recovered when it falls from the conveyor belt T.

Figure 3:
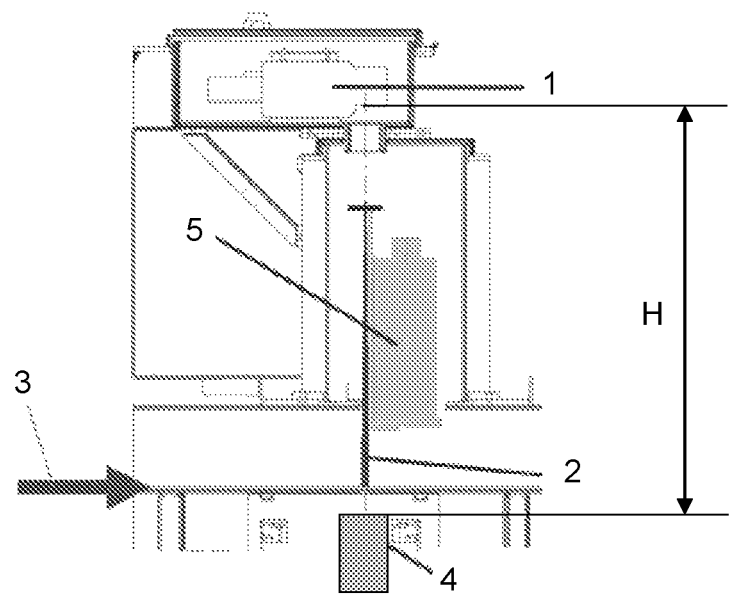
FIG. 3 is a longitudinal sectional view showing schematically the analysis section of a combined XRF-T separator according to the invention.

A separator according to the present invention, the analysis section of which is shown in FIG. 3, differs from the known separators described above in that it involves an X-ray source 1 that produces a radiation beam 2 capable of passing through the material carried by a conveyor belt 3 and reaching an array 4 of transmission sensors, preferably a dual array for "dual energy" analysis. In addition, beam 2 is also capable of generating a fluorescence signal that is detected by an array 5 of SDDs placed adjacent to beam 2, so that the present separator simultaneously performs both an XRF and an XRT analysis using both fluorescence and transmission phenomena caused by the single beam 2.

To this end, the operating parameters of anode-cathode voltage, current intensity and distance H between source 1 and array 4 of transmission sensors were defined by the inventors to succeed in the difficult task of balancing the conflicting requirements of the two different techniques XRF and XRT. In fact, the following ranges differ from those traditionally used in each of the two techniques as described above:
  anode-cathode voltage: 100 kV to 130 kV, preferably 100 kV-110 KV;
  current intensity: at least 20 mA;
  distance H: 300 to 700 mm, preferably 350 mm-550 mm.

The distance of the SDDs array 5 from belt 3 is determined by the maximum height of the pieces that make up material M, with a 10 to 20 mm margin to avoid collisions, this distance being typically 100 to 120 mm but being able to vary generally between 50 mm and 150 mm.

In contrast to the previously mentioned trend of reducing distance, voltage and beam power to maximize the fluorescence signal, the applicant verified that it is surprisingly possible to maintain the ability of the XRF technique to effectively discriminate aluminum alloys even while operating with the above ranges. In this regard, a comparison was made between the fluorescence signal obtainable simply by adding an array of SDDs to a conventional XRT separator and the fluorescence signal obtainable in an XRF-T separator according to the invention.

In the first case, a typical configuration of an XRT separator was used with a distance of 900 mm between source and conveyor belt, a distance of 120 mm between the belt and the SDDs array, an analysis time of 20 ms compatible with the requirements of the metal recycling process, and a generating power of 3 kW (this implies that the voltage-current product must remain constant and that as the voltage increases, the current must decrease). The source has a tungsten target tilted at 20°, so as to achieve a greater shift toward the lower energies of the radiation spectrum, and a beryllium window.

Within the traditional voltage range used for the XRT technique, the fluorescence signal for copper possesses a maximum value of about 190 units on average, since the signal has some oscillation, and the background noise detected with the empty belt is 12 units on average, for a signal-to-noise ratio SNR=15.8. Under these conditions, considering that the minimum detectable signal is equal to the average noise value plus 10 units, to account for signal oscillations, we obtain that the lower limit of detection of copper in an aluminum alloy is a percentage of about 9%. Such sensitivity would not be able to detect the presence of copper in aluminum alloys, where the percentage of copper is no more than 6%.

In the second case, which is within the scope of the present invention, the source distance was reduced to 500 mm, and this distance still provides illumination of a sufficiently large belt width to meet the process throughput in the metal recycling industry. A 0.4-mm-thick aluminum filter was applied to the source in order to decrease the signal background noise and eliminate the tungsten fluorescence lines from the source itself. Note that the system works even without the filter, which was introduced only because it benefited the data processing algorithm, whereas with the source at 900 mm the filter cannot be used because it attenuates the intensity of the beam too much and an adequate fluorescence signal can no longer be obtained.

Using the above voltage range of 100-130 kV, which is lower than that of a conventional XRT separator, the maximum fluorescence signal is obtained at 110 kV and averages about 450 units, while the background noise has an average value of 10 units, resulting in a signal-to-noise ratio SNR=45. Under these conditions, considering that the minimum detectable signal is equal to the average value of the noise plus 5 units, and no longer 10 units as in the first case because the filter reduces the signal oscillation, we obtain that the lower limit of detection of copper in an aluminum alloy is about 3.3%. This value is compatible with the percentages of copper in aluminum alloys, thus allowing the device to be used in the application of separation between aluminum alloys.

The two signals acquired by the fluorescence and transmission sensors are preferably synchronized through an external trigger signal to increase the reliability of the vision system. The result is a transmission map with accurate spatial resolution, of the high energy and low energy in the case of DE sensors, and a fluorescence map with a significantly lower spatial resolution. The transmission signal carries with it the information on the position of the sample, its shape and the nature of the "bulk," while the fluorescence signal carries with it the information on the chemical composition of the surface in the first few hundred micrometers. This makes up for the inherent limitations of the techniques used when considered individually, and exploiting their complementarity provides a greater degree of certainty in the analysis and a wider range of application. In fact, an inconsistency between the two pieces of information is a sign of inhomogeneity in chemical composition.

If, in addition to the absorption, which depends on the thickness of the sample at each point, the transmission signals at high and low energies are correlated with each other, a composition information is obtained that is independent of the height of the piece, and contains exclusively an indication of the volume composition of the piece. This information can be used in addition to absorption and fluorescence, especially in metals where the fluorescence-only signal is weak.

As mentioned earlier, the special technical features of the present separator allow a synergistic effect to be obtained from the combination of the two techniques of XRF and XRT analysis performed simultaneously on the same piece. Moreover, in the preferred embodiment of the dual sensor array 4 of the DE type, the transmission spectrum provides additional data about the nature of the material, and this is useful in the case of materials that produce a weak fluorescence signal such as aluminum alloys, magnesium alloys, light chemical elements such as silicon. The following examples demonstrate the effectiveness and synergistic effect of the claimed combination of XRF and XRT techniques.

EXAMPLE 1

A piece of aluminum alloy of the 1xxx family, with 5 mm thickness and 500 μm thick copper coating: the XRF technique identifies it as 100% copper, the XRT technique identifies it as aluminum alloy of the 2xxx family based on the mixture of the surface copper with the underlying aluminum. Only the combination of the two pieces of information makes it possible to detect the inconsistency in composition and derive that it is in fact a copper-coated 1xxx alloy.

EXAMPLE 2

A piece of aluminum with an iron-based metal insert: the fluorescence signal analysis reports a chemical composition of the sample to be 100 percent aluminum, but the transmission image clearly shows the presence of an object of different chemical composition within it, allowing it to be understood that it is reinforced aluminum and not an aluminum alloy.

EXAMPLE 3

A piece of brass and one of aluminum both covered with more than 500 μm of zinc: fluorescence signal analysis reports a chemical composition of 100 percent zinc for both samples, but the transmission image shows that the aluminum piece possesses a volume density that is lower than that of brass. The combination of the two pieces of information makes it possible to detect that these are two galvanized samples of two different materials and not two zinc-containing alloys.

In general, in all cases in which there is a difference in composition between the surface of the piece and the "bulk," for example due to the presence of surface dirt, which in the case of scrap is very frequent, the combination of the two XRF and XRT techniques allows to obtain information that the two techniques taken individually do not provide. In addition, it should be noted that it would not be possible to apply the two techniques sequentially to the same piece and compare the results, since not only would it be necessary to have two separators in series with a huge increase in the cost and footprint of the separation plant, but it would be physically impossible to trace the path of a piece from one separator to the other since the material is in continuous motion and the piece would be rotated/shifted in the second analysis compared to the first analysis.

It is clear that the embodiment of the separator according to the invention described and illustrated above is only an example susceptible to many variations. In particular, the separator could also be configured for an "on-the-fly" analysis by arranging the analysis section near the beginning of the fall trajectory of the material from a chute or conveyor belt, preferably with the X-ray source and SDDs array below said trajectory.

The invention claimed is:

1. A metal separator comprising:
    an X-ray source configured to produce a radiation beam capable of passing through a ground material containing scrap metal;
    first array of transmission sensors arranged transverse to the feed direction of said ground material and aligned with said radiation beam, said array being positioned on the side of the stream of ground material opposite with respect to said X-ray source; and
    a control unit configured to receive reading data from said array of transmission sensors and to control a valve for emitting an air jet;
    an array of fluorescence sensors positioned adjacent to the radiation beam and arranged transverse to said feed direction, said array being positioned on the same side of the stream of ground material as the X-ray source and being operatively connected to said control unit for transmitting the reading data of the array of fluorescence sensors to the control unit;

and the control unit is configured to analyze- and compare the reading data from both the transmission sensors and the fluorescence sensors relating to the same piece of ground material;

and the X-ray source has the following characteristics
the anode-cathode voltage is between 100 kV and 130 kV;
the current intensity is at least 20 mA;
its distance from the array of transmission sensors is between 300 mm and 700 mm;
further comprising a second array of transmission sensors identical in size and pitch to the first array of transmission sensors but having different energy sensitivity, said two arrays being overlapped so that the upstream array, with respect to the direction of origin of the radiation beam, generates a signal integrating absorption at low energies emitted by the X-ray source, while the downstream array integrates absorption at high energies.

2. The metal separator according to claim 1, wherein the distance of the array of fluorescence sensors from the base of the stream of ground material is between 50 mm and 150 mm.

3. The metal separator according to claim 2, wherein the distance of the array of fluorescence sensors from the base of the stream of ground material is between 100 mm and 120 mm.

4. The metal separator according to claim 1, wherein in the presence of a band of overlapping energies in which both arrays of transmission sensors give a signal, the control unit is configured to filter them out and eliminate them when processing the readout data.

5. The metal separator according to claim 4, wherein the X-ray source has a tungsten target inclined at 20°, a beryllium window and an aluminum filter.

6. The metal separator according to claim 5, wherein the tungsten target has a thickness of 0.4 mm.

7. The metal separator according to claim 4, wherein the control unit is configured to synchronize the two signals acquired from the fluorescence sensors and transmission sensors via an external trigger signal.

8. The metal separator according to claim 1, wherein the X-ray source has a tungsten target inclined at 20°, a beryllium window and an aluminum filter.

9. The metal separator according to claim 8, wherein the control unit is configured to synchronize the two signals acquired from the fluorescence sensors and transmission sensors via an external trigger signal.

10. The metal separator according to claim 8, wherein the tungsten target has a thickness of 0.4 mm.

11. The metal separator according to claim 1, wherein the control unit is configured to synchronize the two signals acquired from the fluorescence sensors and transmission sensors via an external trigger signal.

12. The metal separator according to claim 1, wherein the anode-cathode voltage is between 100 kV and 110 kV.

13. The metal separator according to claim 1, wherein the distance (H) from the array of transmission sensors is between 350 mm and 550 mm.

* * * * *